May 26, 1970     B. A. O. EKMAN     3,513,550

VIBRATOR FOR DENTAL PURPOSES

Filed Oct. 25, 1967

INVENTOR
BJÖRN ANDERS OSKAR EKMAN

BY Linton and Linton

ATTORNEYS

United States Patent Office 3,513,550
Patented May 26, 1970

3,513,550
VIBRATOR FOR DENTAL PURPOSES
Bjorn A. O. Ekman, Gumla Bjorlandavagen 166,
Goteborg, Sweden
Filed Oct. 25, 1967, Ser. No. 678,019
Claims priority, application Sweden, Oct. 26, 1966,
14,680/66; May 12, 1967, 6,679/67
Int. Cl. A61c 3/08
U.S. Cl. 32—54    3 Claims

ABSTRACT OF THE DISCLOSURE

The present vibrator is for use in dental work and connection to driving means for rotating a first member which imparts a rocking movement to a second member used as a working tip, for example, in connection with amalgam fillings.

---

The present invention relates to a vibrator for use in dental work, especially for use in connection with amalgam fillings.

In order to obtain a strong amalgam filling, the amalgam usually must be rather hard in the initial state which makes it difficult to completely fill a tooth cavity without the use of a vibrating tool. A previously known vibrator for this purpose comprises a special handpiece in which the rotating movement from an ordinary dental drill is transformed into a vibrating movement. Another type is ultrasonic vibrators driven from ultrasonic generators. The ultrasonic equipment is of course expensive, and the other known type of vibrator also involves extra cost and necessitates the changing of handpieces.

The object of the present invention is to provide a vibration attachment which may be conveniently used with an ordinary handpiece and which is of simple construction and cheap in manufacturing.

The invention will be described herebelow with reference to the accompanying drawings, wherein.

Figure 1:
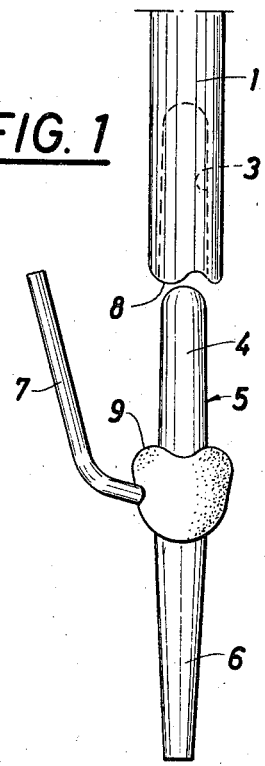
FIG. 1 illustrates an attachment according to one embodiment of the invention.
Figure 2:
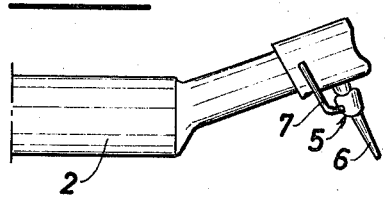
FIG. 2 is a side view to a smaller scale of the front end portion of a handpiece with the attachment according to FIG. 1 connected thereto.

In the embodiment illustrated in FIG. 1 the attachment comprises a sleeve 1 which is adapted for being inserted in an ordinary handpiece such as the handpiece 2 shown in FIG. 2. The sleeve 1 has a slightly tapering bore 3 adapted for receiving a correspondingly tapering end portion 4 of a pin 5, the opposite end portion 6 of which constitutes the vibrating tip of the vibrator. The pin 5 is provided with an arm 7 projecting from the pin between the ends thereof and being bent upwardly to a position in which, when the sleeve 1 is mounted in the handpiece 2 and the end portion 4 of the pin 5 is inserted therein, the arm 7 will abut against the side of the head portion of the handpiece in order to prevent the pin 5 from rotating together with the sleeve 1. The edge of the sleeve 1 at the free end thereof is roughly waveshaped as at 8, and this uneven end surface of the sleeve 1 is intended to cooperate with a portion 9 of the pin 5 which has a similar cam-shaped surface in order to impart a rapid reciprocating movement to the pin 5 when the sleeve 1 is rotated.

In use of the above-described vibration attachment, the vibrating tip 6 is inserted in the tooth cavity after the latter has been filled with amalgam, and a slight pressure will then cause the cam surface 9 of the pin to be pressed against the corresponding surface 8 on the sleeve 1 to cause the above-mentioned vibrating movement of the tip 6. It will be understood that it will not be necessary to provide any means by which the pin 5 is positively maintained in engagement with the sleeve 1. During insertion in the tooth and withdrawal therefrom, respectively, the pin 5 can easily be maintained in position in the sleeve 1 by for instance keeping a finger on the arm 7. If desired, however, the sleeve 1 and pin 5 may for instance be magnetized so that they will remain connected after the end portion 4 of the pin 5 has been inserted into the bore 3 of the sleeve.

Figure 3:
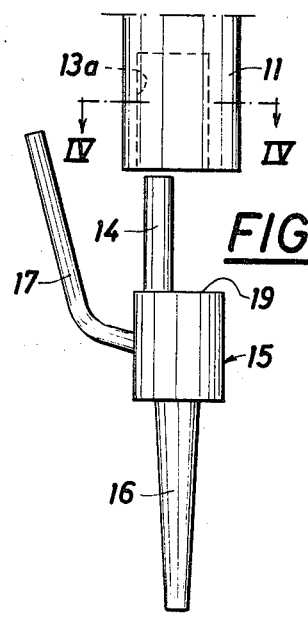
FIG. 3 illustrates another embodiment.
Figure 4:
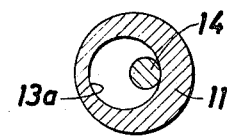
FIG. 4 is a cross section substantially along the line IV—IV in FIG. 3.
Figure 5:
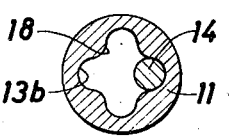
FIG. 5 is a smaller cross section through a modified embodiment.

In the embodiment described above the vibrating tip 6 performs a longitudinal reciprocating movement. In the embodiment illustrated in FIGS. 3–5, the vibrating tip performs an oscillatory movement in a plane at right angles to the axis of the rotating sleeve. In this embodiment the bore of the sleeve 11 is either placed eccentrically or has an out-of-round cross-sectional shape, and the end portion 14 of the pin 15 adapted for being inserted in the bore of the sleeve is offset to an eccentrical position with respect to the vibrating tip 16. Numeral 17 indicates the arm corresponding to the arm 7 of the above-described embodiment. The bore 13a as shown in FIGS. 3 and 4 is placed eccentrically with respect to the axis of rotation of the sleeve 11. In use of the vibrator a slight pressure is exerted sideways so that the end portion 14 of the pin 15 will be pressed against the wall of the bore 13a which will cause the tip 16 to oscillate in a plane at right angles to the longitudinal direction of the tip. A similar operation is obtained with the modified embodiment illustrated in FIG. 5, wherein the bore 13b of the sleeve has an out-of-round cross section forming a number of axially extending cams 18 with which the end portion 14 of the pin 15 inserted into the sleeve co-operates in order to provide the oscillatory movement of the vibrating tip 16. It should be understood that the bore of the sleeve 11 may be shaped in any desired manner which will cause the vibrating tip 16 to move in a transverse plane relative to the longitudinal direction thereof. The end portion 14 of the pin 15 may also have an out-of-round cross-section. Further, it will be possible to make the end surface of the sleeve 11 and the end surface 19 of the central portion of the sleeve 15 with a cam-shaped configuration corresponding to the surfaces 8 and 9 in FIG. 1 in order to obtain a combined longitudinal and transverse movement of the vibrating tip.

What I claim is:

1. A vibrator for dental work comprising a substantially sleeve-shaped first member having one end adapted for connection to driving means for imparting a rotational movement to said sleeve about the geometrical axis thereof, a second elongated member one end of which forms the working tip of the vibrator, the other end of said second member being adapted to extend into the other end of said sleeve-shaped member, means for preventing relative rotation between said first and second members, the internal cross-section of said first member at said other end thereof being of such configuration such as to impart a rocking movement to said second member when said first member is rotated.

2. A vibrator as claimed in claim 1, wherein said other end portion of said second member is offset from the geometrical axis of said working tip end portion.

3. A vibrator for dental work, connectable to a rotary driving means comprising a first member having one end capable of connection to the rotary driving means for rotating said first member, a second member forming the working tip of the vibrator, said second member having cam surfaces and offset end portion and said first member having a second end with cam surfaces positioned on said second member cam surfaces for giving said second member a reciprocating movement and a bore having said second member offset portion loosely extending therein and of a configuration for giving said second member an oscillatory movement.

References Cited

UNITED STATES PATENTS 2,327,203  8/1943  McKenzie _____ 32—54

FOREIGN PATENTS 73,794  2/1952  Denmark.

ROBERT PESHOCK, Primary Examiner